US012608066B2

(12) United States Patent
Bowers et al.

(10) Patent No.: US 12,608,066 B2
(45) Date of Patent: Apr. 21, 2026

(54) LOW POWER DETECTION AND POWER LOSS MANAGEMENT FOR DEVICES WITH LIMITED AVAILABLE POWER

(71) Applicant: Copeland Comfort Control LP, St. Louis, MO (US)

(72) Inventors: James M. Bowers, St. Louis, MO (US); G. Scott Vogel, St. Louis, MO (US); Joseph Roberts, St. Louis, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 204 days.

(21) Appl. No.: 18/596,928

(22) Filed: Mar. 6, 2024

(65) Prior Publication Data

US 2025/0284330 A1 Sep. 11, 2025

(51) Int. Cl.
*G06F 1/32* (2019.01)
*G06F 1/3206* (2019.01)

(52) U.S. Cl.
CPC .................................. *G06F 1/3206* (2013.01)

(58) Field of Classification Search
CPC .................................................... G06F 1/3206
See application file for complete search history.

(56) References Cited

U.S. PATENT DOCUMENTS

| | | | |
|---|---|---|---|
| 9,026,254 B2 | 5/2015 | Warren et al. | |
| 9,098,279 B2 | 8/2015 | Mucignat et al. | |
| 9,618,225 B2 | 4/2017 | Rylski et al. | |
| 2012/0179300 A1* | 7/2012 | Warren | F24F 11/30 |
| | | | 700/278 |
| 2015/0100166 A1* | 4/2015 | Baynes | H04N 21/4227 |
| | | | 700/297 |

OTHER PUBLICATIONS

Smart Thermostats Low Voltage; emerson.com/white-rodgers; Mar. 2, 2023, one page.

* cited by examiner

*Primary Examiner* — Stefan Stoynov
(74) *Attorney, Agent, or Firm* — Harness, Dickey & Pierce, P.L.C.; Anthony G. Fussner

(57) ABSTRACT

The present disclosure relates to low power detection and power loss management for devices with limited available power, such as a thermostat, an equipment interface module, a control board, other device having a battery backup for operating in non-constant power conditions, etc. In an exemplary method of power management in a device including a display, the method comprises automatically turning off power to the display in response to detection of a power loss and/or inadequate power condition for the device. The device may comprise a thermostat, an equipment interface module (EIM), a control board, other device having a battery backup for operating in non-constant power conditions, etc.

25 Claims, 1 Drawing Sheet

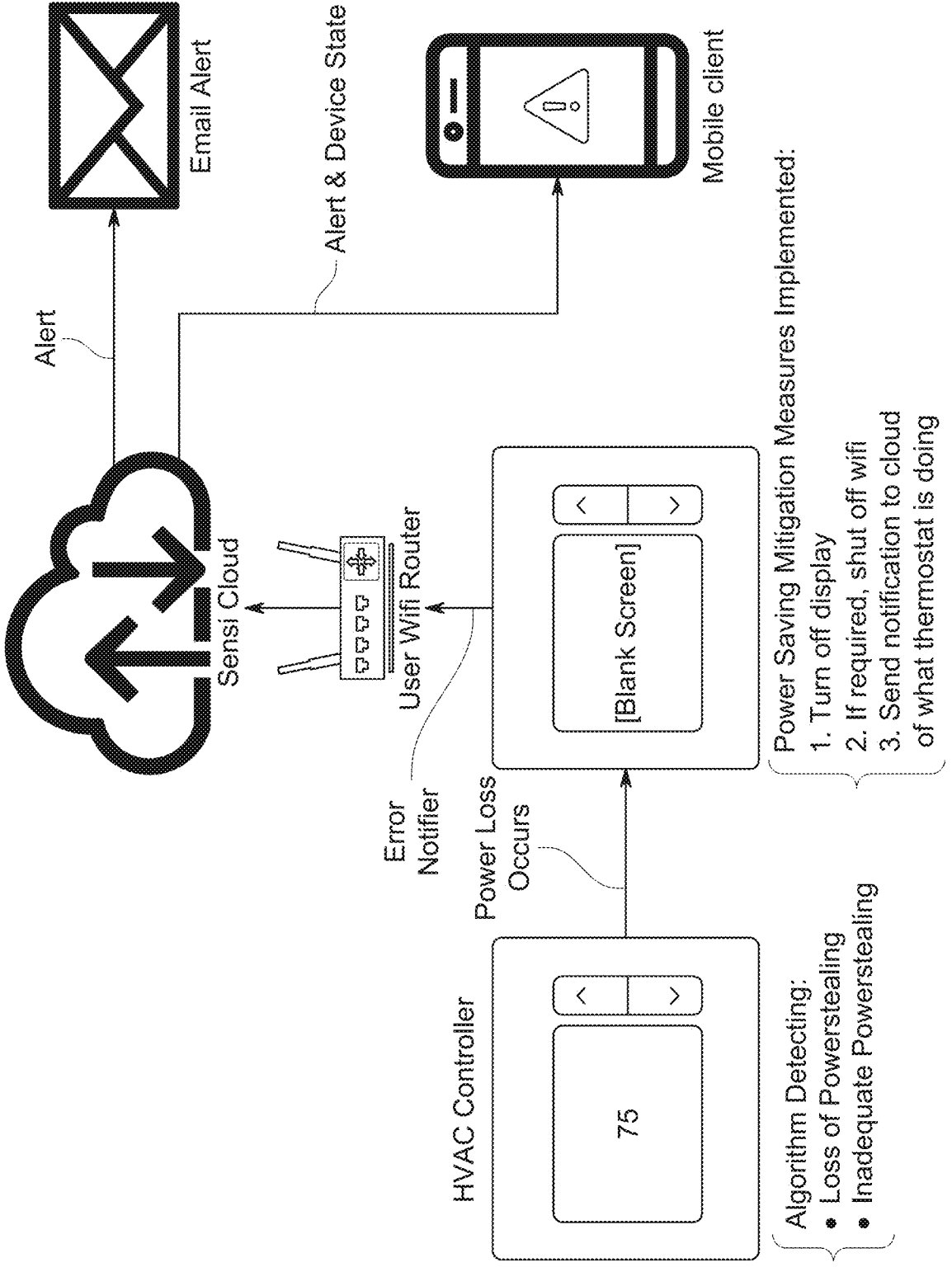

LOW POWER DETECTION AND POWER LOSS MANAGEMENT FOR DEVICES WITH LIMITED AVAILABLE POWER

FIELD

The present disclosure relates to low power detection and power loss management for devices with limited available power, such as a thermostat, an equipment interface module (EIM), a control board, other device having a battery backup for operating in non-constant power conditions, etc.

BACKGROUND

This section provides background information related to the present disclosure which is not necessarily prior art.

Thermostats are installed in spaces for controlling heating, ventilation, and air conditioning (HVAC) systems. Generally, the thermostat is a regulating device that may be used to sense temperature of the space in which it is installed and thereafter perform actions so that the temperature of the space is maintained near a desired setpoint.

Thermostats may be powered by power stealing from the HVAC system. Power stealing is a technique in which power for a thermostat is drawn from or "stolen" from the connections to the heating transformer or the cooling transformer when such transformers are not connected to a load. Power stealing essentially derives power from a transformer at a current level low enough to prevent the load from being engaged. Thermostats may also draw power from a power supply internal to the thermostat, such as batteries.

DRAWINGS

The drawings described herein are for illustrative purposes only of selected embodiments and not all possible implementations, and are not intended to limit the scope of the present disclosure.

FIG. 1 illustrates an exemplary system including an HVAC controller (e.g., a Wi-Fi enabled smart thermostat, etc.) configured to be operable with low power detection and power loss management according to an exemplary embodiment of the present disclosure.

DETAILED DESCRIPTION

Example embodiments will now be described more fully with reference to the accompanying drawings.

Some thermostats and other devices (e.g., equipment interface module (EIM), connected control board, HVAC controller, etc.) may be configured to rely on power stealing from the HVAC equipment. If the HVAC power stealing is limited or unavailable, the device needs to preserve its backup power to keep controlling the HVAC equipment.

After recognizing the above, exemplary embodiments were developed and/or are disclosed herein for low power detection and power loss management for devices with limited available power, such as a thermostat, an equipment interface module, a control board, other device having a battery backup for operating in non-constant power conditions, etc.

In exemplary embodiments, a device is configured to automatically recognize or detect (e.g., algorithmically detect via a firmware algorithm, etc.) when power stealing by the device from a system (e.g., HVAC system etc.) is unavailable or limited/inadequate. For example, there may be a limited power stealing condition that is inadequate for full operational capability of the device.

In response to the detection of the inadequate or unavailable power stealing by the device from the system, the device is configured to be operable for automatically implementing power saving mitigation measures to preserve backup power, including automatically shutting off power to the device display. The device may also automatically shut down its blacklight in addition to automatically turning off its display in response to detection of the inadequate or unavailable power stealing by the device from the system. Accordingly, the device display may thus be completely dark or blank without any illuminated user message or other indicia left on the display.

In addition, the device may also automatically shut off its internet connectivity (e.g., shut off its Wi-Fi radio or internet radio, etc.) if necessary for the device to have sufficient power to continue to control the system in response to detection of the inadequate or unavailable power stealing by the device from the system. The device may also possibly alert the user of the limited/unavailable power state of the device. For example, the device may automatically send an error notifier to the cloud (e.g., cloud messaging, etc.) via the user Wi-Fi router, which then generates an email alert and/or alert and device state to a mobile client (e.g., smartphone, tablet, other portable terminal or communication device, etc.).

In an exemplary embodiment, a thermostat (e.g., a SENSI™ LITE smart thermostat, other Wi-Fi enabled smart thermostat, etc.) is configured for use with a 2-wire system, i.e., with heat only. The thermostat includes a Wi-Fi radio. And there may be times when the battery power required for operation of the Wi-Fi radio is too low for operation of the Wi-Fi. In which case, the thermostat is configured to begin to deactivate certain functions (e.g., backlight, display, etc.) to preserve power for the Wi-Fi connection to the server. The thermostat is configured to send a message to the server or cloud (e.g., cloud messaging, etc.), via the Wi-Fi connection, that the thermostat has turned off the display, e.g., to thereby alert the homeowner not to worry about the non-operational display, etc. The thermostat is further configured to eventually turn off the Wi-Fi if necessary to enable the thermostat to continue to operate the HVAC system.

FIG. 1 illustrates an exemplary system including an HVAC controller (e.g., a Wi-Fi enabled smart thermostat, etc.) configured to be operable with low power detection and power loss management according to an exemplary embodiment of the present disclosure. As shown in FIG. 1, the HVAC controller is configured to automatically detect (e.g., algorithmic detect via a firmware algorithm, etc.) loss of power stealing or inadequate power stealing from the HVAC system. When the power stealing loss or inadequate power stealing is detected, the HVAC controller is configured to automatically implement one or more power saving mitigation measures including automatically turning off its display.

The HVAC controller may also automatically shut down its blacklight in addition to automatically turning off its display when the power stealing loss or inadequate power stealing is detected. Accordingly, the HVAC controller's display may thus be completely dark or blank without any illuminated user message or other indicia left on the display.

In addition, the HVAC controller may also automatically shut off its Wi-Fi radio if necessary for the HVAC controller to have sufficient power to continue to control the HVAC system in response to detection of a loss of power stealing and/or inadequate power stealing by the HVAC controller from the HVAC system. The HVAC controller may automatically send an error notifier to the cloud (e.g., cloud messaging, etc.) via the user Wi-Fi router, which then generates an email alert and/or alert and device state to a mobile client (e.g., smartphone, tablet, other portable terminal or communication device, etc.).

Exemplary embodiments disclosed herein may advantageously result in improved customer satisfaction and review. Exemplary embodiments disclosed herein may also advantageously result in reduced returned non-defective thermostats, etc.

Exemplary embodiments are disclosed for low power detection and power loss management for devices with limited available power, such as a thermostat, an equipment interface module, a control board, other device having a battery backup for operating in non-constant power conditions, etc.

In exemplary methods of power management in a device including a display, the method comprises automatically turning off power to the display in response to detection of a power loss and/or inadequate power condition for the device. For example, there may be a limited power condition that is inadequate for full operational capability of the device.

In exemplary methods, the device may comprise a thermostat, an equipment interface module (EIM), a control board, other device having a battery backup for operating in non-constant power conditions, etc.

In exemplary methods, the device may be configured to be operable for power stealing from a system (e.g., HVAC system, etc.). And the method may include automatically turning off power to the display of the device (e.g., thermostat, HVAC controller, etc.) in response to detection of a loss of power stealing and/or inadequate power stealing by the device from the system.

In exemplary methods, the device comprises a thermostat configured to be operable for power stealing from an HVAC system. And automatically turning off power to the display in response to detection of a power loss and/or inadequate power condition for the device comprises automatically turning off power to a display of the thermostat in response to detection of a loss of power stealing and/or inadequate power stealing by the thermostat from the HVAC system.

In exemplary methods, the method includes automatically monitoring the device to detect a power loss and/or inadequate power condition for the device.

In exemplary methods, the method includes automatically detecting a power loss and/or inadequate power condition for the device.

In exemplary methods, automatically detecting a power loss and/or inadequate power condition for the device comprises algorithmically detecting, via a firmware algorithm of the device, a power loss and/or inadequate power condition for the device.

In exemplary methods, automatically turning off power to the display in response to detection of a power loss and/or inadequate power condition for the device comprises the device automatically turning off power to its display in response to detection of a power loss and/or inadequate power condition for the device.

In exemplary methods, automatically turning off power to the display in response to detection of a power loss and/or inadequate power condition for the device comprises automatically turning off power to the display without manual user intervention in response to detection of a power loss and/or inadequate power condition for the device.

In exemplary methods, the method includes automatically turning off power to the display in response to detection of a power loss and/or inadequate power condition for the device such that the display is completely dark, blank, and/or without any illuminated user message or other indicia left on the display.

In exemplary methods, the method further includes automatically turning off power to a backlight of the device in response to detection of a power loss and/or inadequate power condition for the device.

In exemplary methods, the method includes automatically turning off power to the display and the backlight of the device in response to detection of a power loss and/or inadequate power condition for the device such that the display is completely dark, blank, and/or without any illuminated user message or other indicia left on the display.

In exemplary methods, the method includes automatically turning off power to the display in response to detection of a power loss and/or inadequate power condition for the device, before sending a notification, message, and/or alert about turning off power to the display. After automatically turning off power to the display, the method may include sending a notification, message, and/or alert (e.g., cloud messaging, electronically notifying, alerting, etc.) that the power has been turned off to the display.

In exemplary methods, the method includes automatically turning off power to the display and a backlight of the device in response to detection of a power loss and/or inadequate power condition for the device, before sending a notification, message, and/or alert about turning off the power to the display and the backlight of the device. After automatically turning off power to the display and the backlight of the device, the method may include sending a notification, message, and/or alert (e.g., cloud messaging, electronically notifying, alerting, etc.) that the power has been turned off to the display and the backlight of the device.

In exemplary methods, the method may include sending the notification, message, and/or alert to a mobile client, via a server or cloud messaging. The method may also include sending the notification, message, and/or alert to an App on the mobile client via a Wi-Fi router.

In exemplary methods, the method includes automatically turning off a Wi-Fi radio or internet radio of the device if necessary for the device to have sufficient power to continue to control a system in response to detection of a power loss and/or inadequate power condition for the device.

In exemplary methods, the device comprises a thermostat including a display and a Wi-Fi radio. The thermostat is configured to be operable for power stealing from an HVAC system. The method includes the thermostat automatically turning off power to its display in response to detection of a loss of power stealing and/or inadequate power stealing by the thermostat from the HVAC system. And the method further includes the thermostat automatically turning off its Wi-Fi radio if necessary for the thermostat to have sufficient power to continue to control the HVAC system in response to detection of a loss of power stealing and/or inadequate power stealing by the thermostat from the HVAC system.

In exemplary methods of power management in a thermostat including a display and configured to be operable for power stealing from an HVAC system, the method comprises the thermostat automatically turning off power to its display in response to detection of a loss of power stealing and/or inadequate power stealing by the thermostat from the HVAC system, whereby the display of the thermostat is completely dark, blank, and/or without any illuminated user message or other indicia left on the display.

In exemplary methods, the thermostat includes a Wi-Fi radio. And method includes the thermostat automatically turning off its Wi-Fi radio if necessary for the thermostat to have sufficient power to continue to control the HVAC system in response to detection of a loss of power stealing and/or inadequate power stealing by the thermostat from the HVAC system.

In exemplary methods, the method includes the thermostat automatically monitoring power stealing by the thermostat from the HVAC system for automatically detecting a loss of power stealing and/or inadequate power stealing by the thermostat from the HVAC system.

In exemplary methods, the thermostat includes a backlight. And the method includes the thermostat automatically turning off power to its backlight in response to detection of a loss of power stealing and/or inadequate power stealing by the thermostat from the HVAC system.

In exemplary methods, the method includes the thermostat automatically turning off power to its display in response to detection of a loss of power stealing and/or inadequate power stealing by the thermostat from the HVAC system, before the thermostat sends a notification, message, and/or alert about turning off power to the display. And the method further includes the thermostat sending a notification, message, and/or alert that the power has been turned off to the display after the thermostat automatically turned off power to its display.

In exemplary embodiments, a device includes a display and a non-rechargeable battery backup for operating in non-constant power conditions. The device is configured to perform a method as disclosed herein. The device may comprise a thermostat, an equipment interface module (EIM), a control board, other device having a battery backup for operating in non-constant power conditions, etc.

Also disclosed are exemplary embodiments of devices (e.g., Wi-Fi enabled smart thermostat, an equipment interface module (EIM), a control board, other device having a battery backup for operating in non-constant power conditions, etc.).

In exemplary embodiments, a device comprises a display and is configured to be operable for power stealing from a system. The device is configured to be operable for automatically turning off power to its display in response to detection of a loss of power stealing and/or inadequate power stealing by the device from the system. After the power is turned off to the display, the display may then be completely dark, blank, and/or without any illuminated user message or other indicia left on the display.

In exemplary embodiments, the device includes a Wi-Fi radio. And the device is configured to be operable for automatically turning off its Wi-Fi radio if necessary for the device to have sufficient power to continue to control the system in response to detection of a loss of power stealing and/or inadequate power stealing by the device from the system.

In exemplary embodiments, the device is configured to be operable for automatically monitoring power stealing by the device from the system for automatically detecting (e.g., algorithmically via a firmware algorithm, etc.) a loss of power stealing and/or inadequate power stealing by the device from the system.

In exemplary embodiments, the device includes a backlight. And the device is configured to be operable for automatically turning off power to its backlight in response to detection of a loss of power stealing and/or inadequate power stealing by the device from the system.

In exemplary embodiments, the device is configured to be operable for automatically turning off power to its display in response to detection of a loss of power stealing and/or inadequate power stealing by the device from the system, before the device sends a notification, message, and/or alert about turning off power to the display. After the device automatically turns off power to its display, the device is configured to be operable for sending a notification, message, and/or alert that the power has been turned off to the display.

In exemplary embodiments, a thermostat comprises a display and is configured to be operable for power stealing from an HVAC system. The thermostat is configured to be operable for automatically turning off power to its display in response to detection of a loss of power stealing and/or inadequate power stealing by the thermostat from the HVAC system. After the power is turned off to the display, the display may then be completely dark, blank, and/or without any illuminated user message or other indicia left on the display.

In exemplary embodiments, the thermostat includes a Wi-Fi radio. And the thermostat is configured to be operable for automatically turning off its Wi-Fi radio if necessary for the thermostat to have sufficient power to continue to control the HVAC system in response to detection of a loss of power stealing and/or inadequate power stealing by the thermostat from the HVAC system.

In exemplary embodiments, the thermostat is configured to be operable for automatically monitoring power stealing by the thermostat from the HVAC system for automatically detecting a loss of power stealing and/or inadequate power stealing by the thermostat from the HVAC system.

In exemplary embodiments, the thermostat includes a backlight. And the thermostat is configured to be operable for automatically turning off power to its backlight in response to detection of a loss of power stealing and/or inadequate power stealing by the thermostat from the HVAC system.

In exemplary embodiments, the thermostat is configured to be operable for automatically turning off power to its display in response to detection of a loss of power stealing and/or inadequate power stealing by the thermostat from the HVAC system, before the thermostat sends a notification, message, and/or alert about turning off power to the display. After the thermostat automatically turns off power to its display, the thermostat is configured to be operable for sending a notification, message, and/or alert that the power has been turned off to the display.

Exemplary embodiments include non-transitory computer-readable storage media including executable instructions (e.g., a firmware algorithm, etc.) for power management in a device including a display, which, when executed by at least one processor, cause the at least one processor to be operable for automatically turning off power to the display in response to detection of a power loss and/or inadequate power condition for the device.

In exemplary embodiments, the device may comprise a thermostat, an equipment interface module (EIM), a control board, other device having a battery backup for operating in non-constant power conditions, etc. And the device may be configured to be operable for power stealing from a system (e.g., HVAC system, etc.). And the at least one processor may be operable for automatically turning off power to the display of the device (e.g., thermostat, HVAC controller, etc.) in response to detection of a loss of power stealing and/or inadequate power stealing by the device from the system.

In exemplary embodiments, the executable instructions include instructions that when executed by the at least one processor, cause the at least one processor to be operable for performing at least one of, any combination of, and/or all of the processes and/or method steps disclosed herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of power management in a device including a display and configured to be operable for power stealing from a system, the method comprising:
    automatically detecting a loss or inadequate level of power stealing from the system, the detection including determining that available power stealing from the system is inadequate for full operational capability of the device;

automatically turning off power to the display in response to detection of the loss or inadequate level of power stealing from the system; and in response to detection of the loss or inadequate level of power stealing from the system, the method includes automatically and in a prescribed sequence turning off power to (i) the display, (ii) a backlight of the device, and (iii) a Wi-Fi radio of the device, wherein power to the display is turned off before any notification, message, or alert is sent, such that the display becomes completely dark without any illuminated indicia.

2. The method of claim 1, wherein automatically detecting a loss or inadequate level of power stealing from the system comprises algorithmically detecting, via a firmware-executed power-stealing evaluation algorithm, a loss or inadequate level of power stealing from the system.

3. The method of claim 1, wherein:

the device comprises a thermostat configured to be operable for power stealing from an HVAC system;

automatically detecting a loss or inadequate level of power stealing from the system comprises automatically detecting a loss of power stealing and/or inadequate power stealing by the thermostat from the HVAC system, the detection including determining that available power stealing by the thermostat from the HVAC system is inadequate for full operational capability of the thermostat; and automatically turning off power to the display comprises automatically turning off power to a display of the thermostat in response to detection of a loss of power stealing and/or inadequate power stealing by the thermostat from the HVAC system.

4. The method of claim 1, wherein automatically detecting a loss or inadequate level of power stealing from the system comprises algorithmically detecting, via a firmware-executed power-stealing evaluation algorithm, a loss or inadequate level of power stealing from the system, the detection including determining that the available power stealing falls below a threshold required for full operational capability of the device over a defined evaluation interval.

5. The method of claim 1, wherein automatically turning off power to the display comprises the device automatically turning off power to its display in response to detection of the loss or inadequate level of power stealing from the system.

6. The method of claim 1, wherein automatically turning off power to the display comprises automatically turning off power to the display without manual user intervention in response to detection of the loss or inadequate level of power stealing from the system.

7. The method of claim 1, wherein the method includes automatically turning off power to the display and a backlight of the device in response to detection of the loss or inadequate level of power stealing from the system such that the display is completely dark, blank, and/or without any illuminated user message or other indicia left on the display.

8. The method of claim 1, wherein the method includes automatically turning off power to the display in response to detection of the loss or inadequate level of power stealing from the system, before sending a notification, message, and/or alert about turning off power to the display.

9. The method of claim 8, wherein after automatically turning off power to the display, the method includes sending a notification, message, and/or alert that the power has been turned off to the display.

10. The method of claim 1, wherein the method includes automatically turning off power to the display and the backlight of the device in response to detection of the loss or inadequate level of power stealing from the system, before sending a notification, message, and/or alert about turning off power to the display and the backlight of the device.

11. The method of claim 10, wherein after automatically turning off power to the display and the backlight of the device, the method includes sending a notification, message, and/or alert that the power has been turned off to the display and the backlight of the device.

12. The method of claim 1, wherein the method includes automatically turning off the Wi-Fi radio or internet radio of the device if necessary for the device to have sufficient power to continue to control the system in response to detection of the loss or inadequate level of power stealing from the system.

13. The method of claim 1, wherein:

the device comprises a thermostat including a display and a Wi-Fi radio, the thermostat configured to be operable for power stealing from an HVAC system;

automatically detecting a loss or inadequate level of power stealing from the system comprises automatically detecting a loss of power stealing and/or inadequate power stealing by the thermostat from the HVAC system, the detection including determining that available power stealing by the thermostat from the HVAC system is inadequate for full operational capability of the thermostat; and automatically turning off power to the display comprises the thermostat automatically turning off power to its display in response to detection of a loss of power stealing and/or inadequate power stealing by the thermostat from the HVAC system; and the method further includes the thermostat automatically turning off its Wi-Fi radio if necessary for the thermostat to have sufficient power to continue to control the HVAC system in response to detection of a loss of power stealing and/or inadequate power stealing by the thermostat from the HVAC system.

14. A method of power management in a device including a display and configured to be operable for power stealing from a system, the method comprising:

automatically detecting a loss or inadequate level of power stealing from the system, the detection including determining that available power stealing from the system is inadequate for full operational capability of the device;

automatically turning off power to the display in response to detection of the loss or inadequate level of power stealing from the system;

wherein in response to detection of the loss or inadequate level of power stealing from the system, the method includes:

automatically shutting off power to the display as a first-priority action, such that the display becomes completely dark without illuminated user indicia;

automatically shutting off power to a backlight of the device as a second-priority action;

automatically shutting off a Wi-Fi radio of the device as a third-priority action, only after determining that continued Wi-Fi operation would otherwise compromise system control; and after the display is completely dark, sending a notification to a cloud server indicating that the display has been turned off.

15. A method of power management in a device including a display and configured to be operable for power stealing from a system, the method comprising:

automatically detecting a loss or inadequate level of power stealing from the system, the detection including determining that available power stealing from the system is inadequate for full operational capability of the device;

automatically turning off power to the display in response to detection of the loss or inadequate level of power stealing from the system;

wherein the method includes automatically turning off power to the display in response to detection of the loss or inadequate level of power stealing from the system such that the display is completely dark, blank, and/or without any illuminated user message or other indicia left on the display, wherein the display is maintained in the dark state without any subsequent periodic illumination or warning display until restoration of adequate available power stealing from the system for full operational capability of the device, and wherein the device comprises a non-rechargeable battery backup for operating in non-constant power conditions.

16. A method of power management in a thermostat including a display and configured to be operable for power stealing from an HVAC system, the method comprising:

automatically detecting a loss of power stealing and/or inadequate power stealing by the thermostat from the HVAC system, the detection including determining that available power stealing by the thermostat from the HVAC system is inadequate for full operational capability of the thermostat;

the thermostat automatically turning off power to its display in response to detection of a loss of power stealing and/or inadequate power stealing by the thermostat from the HVAC system, whereby the display of the thermostat is completely dark, blank, and/or without any illuminated user message or other indicia left on the display;

in response to detection of the loss of power stealing and/or inadequate power stealing by the thermostat from the HVAC system, the method includes:

automatically shutting off power to the display as a first-priority action, such that the display becomes completely dark without illuminated user indicia;

automatically shutting off power to a backlight of the thermostat as a second-priority action;

automatically shutting off a Wi-Fi radio of the thermostat as a third-priority action, only after determining that continued Wi-Fi operation would otherwise compromise HVAC control; and after the display is completely dark, sending a notification to a cloud server indicating that the display has been turned off.

17. The method of claim 16, wherein:

the method includes the thermostat automatically turning off its Wi-Fi radio if necessary for the thermostat to have sufficient power to continue to control the HVAC system in response to detection of a loss of power stealing and/or inadequate power stealing by the thermostat from the HVAC system.

18. The method of claim 16, wherein:

the method includes the thermostat automatically turning off power to its backlight in response to detection of a loss of power stealing and/or inadequate power stealing by the thermostat from the HVAC system.

19. The method of claim 16, wherein the method includes:

the thermostat automatically turning off power to its display in response to detection of a loss of power stealing and/or inadequate power stealing by the thermostat from the HVAC system, before the thermostat sends a notification, message, and/or alert about turning off power to the display; and after the thermostat automatically turns off power to its display, the method includes the thermostat sending a notification, message, and/or alert that the power has been turned off to the display.

20. A device comprising a display and configured to be operable for power stealing from a system, the device configured to be operable for:

automatically detecting a loss of power stealing and/or inadequate power stealing by the device from the system, the detection including determining that available power stealing by the device from the system is inadequate for full operational capability of the device;

automatically turning off power to its display in response to detection of a loss of power stealing and/or inadequate power stealing by the device from the system, whereby the display of the device is completely dark, blank, and/or without any illuminated user message or other indicia left on the display;

in response to detection of the loss or inadequate level of power stealing by the device from the system, the device is configured to be operable for:

automatically shutting off power to the display as a first-priority action, such that the display becomes completely dark without illuminated user indicia;

automatically shutting off power to a backlight of the device as a second-priority action;

automatically shutting off a Wi-Fi radio of the device as a third-priority action, only after determining that continued Wi-Fi operation would otherwise compromise system control; and after the display is completely dark, sending a notification to a cloud server indicating that the display has been turned off.

21. The device of claim 20, wherein:

the device is configured to be operable for automatically turning off its Wi-Fi radio if necessary for the device to have sufficient power to continue to control the system in response to detection of a loss of power stealing and/or inadequate power stealing by the device from the system.

22. The device of claim 20, wherein:

the device is configured to be operable for automatically turning off power to its display in response to detection of a loss of power stealing and/or inadequate power stealing by the device from the system, before the device sends a notification, message, and/or alert about turning off power to the display; and after the device automatically turns off power to its display, the device is configured to be operable for sending a notification, message, and/or alert that the power has been turned off to the display.

23. A thermostat comprising a display and configured to be operable for power stealing from an HVAC system, the thermostat configured to be operable for:

automatically detecting a loss of power stealing and/or inadequate power stealing by the thermostat from the HVAC system, the detection including determining that available power stealing by the thermostat from the HVAC system is inadequate for full operational capability of the thermostat;

automatically turning off power to its display in response
    to detection of a loss of power stealing and/or inad-
    equate power stealing by the thermostat from the
    HVAC system, whereby the display of the thermostat is
    completely dark, blank, and/or without any illuminated
    user message or other indicia left on the display;
in response to detection of the loss of power stealing
    and/or inadequate power stealing by the thermostat
    from the HVAC system, the thermostat is configured to
    be operable for:
    automatically shutting off power to the display as a
        first-priority action, such that the display becomes
        completely dark without illuminated user indicia;
    automatically shutting off power to a backlight of the
        thermostat as a second-priority action;
    automatically shutting off a Wi-Fi radio of the thermo-
        stat as a third-priority action, only after determining
        that continued Wi-Fi operation would otherwise
        compromise HVAC control; and
    after the display is completely dark, sending a notifi-
        cation to a cloud server indicating that the display
        has been turned off.

24. The thermostat of claim 23, wherein:

the thermostat is configured to be operable for automati-
    cally turning off its Wi-Fi radio if necessary for the
    thermostat to have sufficient power to continue to
    control the HVAC system in response to detection of a
    loss of power stealing and/or inadequate power stealing
    by the thermostat from the HVAC system.

25. The thermostat of claim 23, wherein:

the thermostat is configured to be operable for automati-
    cally turning off power to its display in response to
    detection of a loss of power stealing and/or inadequate
    power stealing by the thermostat from the HVAC
    system, before the thermostat sends a notification,
    message, and/or alert about turning off power to the
    display; and after the thermostat automatically turns off power to its
    display, the thermostat is configured to be operable for
    sending a notification, message, and/or alert that the
    power has been turned off to the display.

*   *   *   *   *